United States Patent [19]

Wohlwend

[11] 3,818,926
[45] June 25, 1974

[54] HYDRAULIC VALVE AND SYSTEM

[76] Inventor: Donald M. Wohlwend, 16455 S.E. 44th St., Issaquah, Wash. 98027

[22] Filed: Apr. 11, 1973

[21] Appl. No.: 350,179

[52] U.S. Cl. .................. 137/101, 60/422, 60/427, 60/433
[51] Int. Cl. .................................................. G05d 7/01
[58] Field of Search ....... 137/101, 117; 60/422, 427

[56] References Cited
UNITED STATES PATENTS
| | | | |
|---|---|---|---|
| 2,624,361 | 1/1953 | Brown | 60/427 X |
| 3,024,798 | 3/1962 | Banker | 137/117 X |
| 3,200,830 | 8/1965 | Moyer et al. | 137/101 |

*Primary Examiner*—Robert G. Nilson
*Attorney, Agent, or Firm*—Graybeal, Barnard, Uhlir & Hughes

[57] ABSTRACT

A valve plug is movable between first and second outlets. A two position selector rod is movable to push the valve plug into a first position in which it blocks flow through the second outlet and all flow is through the first outlet. The selector rod is retractable from the valve plug into its second position. When this is done the position of the valve plug is determined by pressure differential and calibrated spring forces acting on it. These forces position the valve plug to divide flow between the two outlets. Flow through the second outlet is maintained substantially constant while excess flow is diverted through the first outlet.

17 Claims, 11 Drawing Figures

PATENTED JUN 25 1974      3,818,926

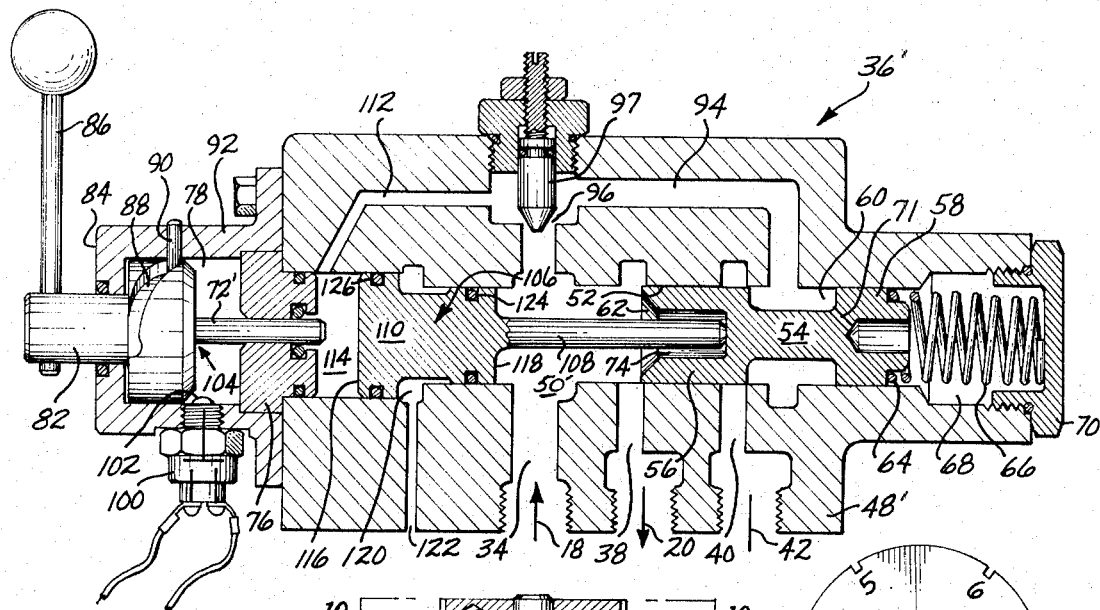
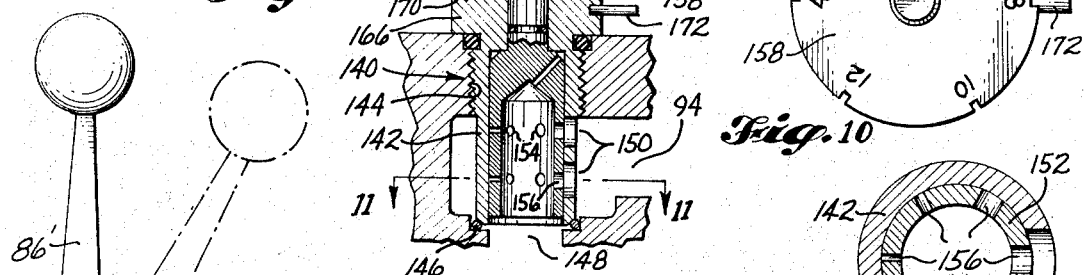
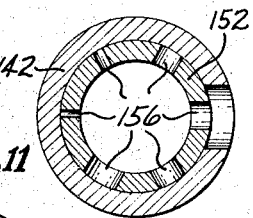
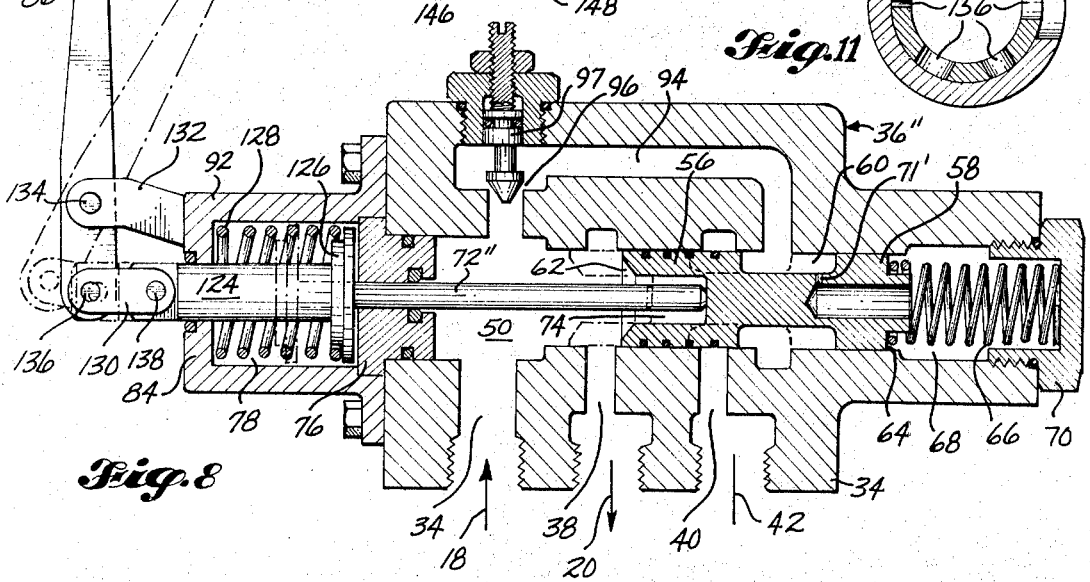

HYDRAULIC VALVE AND SYSTEM

BACKGROUND OF THE INVENTION

This invention relates to a valve which is connectable into the hydraulic circuit for a primary hydraulic tool or utilization device for withdrawing a controlled amount of hydraulic fluid therefrom to operate an auxiliary hydraulic tool or utilization device.

There are many tractor type vehicles in use today which include hydraulically powered primary tools, such as loader buckets, dozing blades, back hoes, etc. In recent years various types of auxiliary hydraulic tools have been introduced for operation from the hydraulic systems provided on these vehicles. Examples of such auxiliary tools are impact wrenches, drills, grinders, brakers, alternators, chain saws, circular saws, pruning saws, sump pumps, and soil compacters. A full line of tools of this type are presently offered by Ackley Manufacturing Co., of Clackamas, Oreg. The use of such auxiliary hydraulic tools has brought about a need for a simple manner of connecting the auxiliary tool into the hydraulic systems for the primary tools, so that hydraulic fluid can easily be withdrawn from such system only when needed to operate the auxiliary tool.

SUMMARY OF THE INVENTION

The primary object of this invention is to provide a simple valve which is easily connected into the hydraulic circuit for the primary tool and which includes a single valve plug member which is line pressure responsive during use of the auxiliary tool, to maintain a constant flow of hydraulic fluid to the auxiliary tool, and which is arranged to be moved by a selector rod member into a position for blocking all flow to the auxiliary device and directing such flow back into the hydraulic circuit for the primary tool, when the auxiliary tool is not being used.

According to the present invention, the valve includes an inlet and first and second outlets. A first passageway extends from the inlet to the first outlet and a second passageway extends from the inlet to the second outlet. A pressure drop restriction is provided in the second passageway. A valve plug member is mounted in said housing for movement between an at rest position in which it blocks the first passageway and the second passageway is open, and a second position in which it blocks the second passageway and the first passageway is open. This valve plug member includes a first transverse surface which is subjected to the inlet pressure and an oppositely directed second transverse surface which is subjected to the pressure in the second passageway downstream of the pressure drop restriction. The selector rod is movable against the valve plug for first moving it into its second position. Movement of the selector rod in the opposite direction frees the valve plug member for movement in response to an unbalanced pressure force acting on its first transverse surface. A calibrated spring is mounted to exert an endwise force on the valve member, tending to move it into its at rest position. The spring calibration is such that when the selector rod is in its second position, and there is flow through the valve, the spring force and the pressure differential across the two transverse surfaces together position the valve plug, to divide flow between the first and second passageways as necessary to maintain a substantially constant flow through the second passageway.

The present invention also relates to additional features of the valve, which will be apparent from the following description and the accompanying sheets of drawing, both relating to preferred embodiments of the invention.

These and other features, advantages and characteristics of the auxiliary tool power circuit and the selector-flow control valve of this invention will be apparent from the following detailed description of typical and therefore non-limitive embodiments of such circuit and valve, and from the accompanying illustrations.

BRIEF DESCRIPTION OF THE DRAWING

FIG. 7 is another sectional view of the second embodiment, showing the valve spool after it has been pressure shifted into a position in which all flow through the valve is directed back into the circuit for the primary utilization device;

FIG. 8 is another longitudinal sectional view of a third embodiment of the invention, incorporating a selector rod that is spring biased to normally hold the valve spool into a position wherein all flow is directed back into the primary system;

FIG. 9 is a fragmentary sectional view in the region of the pressure drop restriction, showing a modified form of adjustable restriction;

FIG. 10 is a top plan view of the selector knob used for rotating the orifice member portion of the adjustable restriction, taken from the aspect of line 10—10 in FIG. 9; and FIG. 11 is a cross-sectional view taken through the upper row of orifices, substantially along line 11—11 of FIG. 9.

DESCRIPTION OF THE PREFERRED EMBODIMENTS

Figure 1:
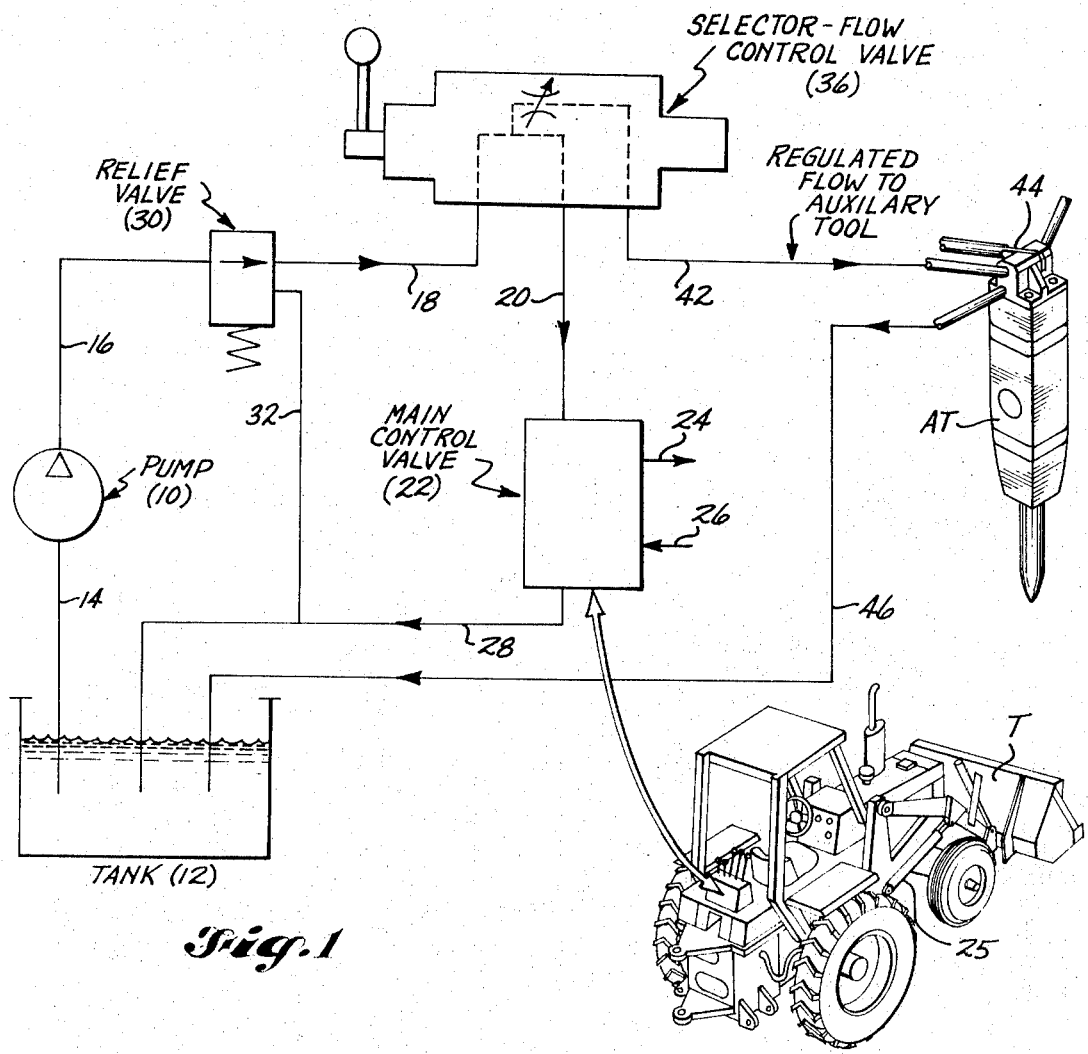
FIG. 1 is a schematic diagram of a representative hydraulic circuit incorporating the present invention.

FIG. 1 is a schematic view of a typical hydraulic system for a tractor carried hydraulic powered tool T (e.g. a loader bucket) which has been modified in accordance with the present invention. In a manner that is hereafter described, the hydraulic system has been modified to permit a controlled amount of hydraulic fluid to be diverted therefrom to a hydraulic powered auxiliary tool AT (e.g. a hydraulic breaker, an impact wrench, a drill, a saw, etc.).

The primary or basic hydraulic circuit comprises a pump 10 for pumping hydraulic fluid from a reservoir or tank 12 through lines 14, 16, 18, 20 to a primary control valve 22. Valve 22 includes one or more delivery lines 24 leading to the primary hydraulic motor(s) 25 for the utilization device or tool T and one or more return lines 26 leading from such motor(s) 25 back to the valve 22. A return line 28 carries the returned hydraulic fluid from the valve 22 back into the tank 12. The primary circuit also includes a relief valve 30 and a relief line 32 which short-circuits the primary control valve 22.

Valve 22 is an open center type of valve. When it is in neutral and the pump 10 is operating the pumped hydraulic fluid flows continuously through the valve 22 back to the tank 12. At no time does valve 22 intentionally block flow in line 20.

Prior to the system being modified in accordance to the present invention line 18 was connected directly to line 20, i.e. these two lines were a single line. In accordance with the present invention, such single line was separated into the two parts 18, 20. Line 18 was then attached to an inlet port 34 (FIG. 2-4), and line 20 to a first outlet port 38, of a selector-flow control valve 36. Valve 36 includes a second outlet port 40 to which a delivery line 42 extending to the auxiliary tool AT is connected. By way of a typical and therefore non-limitive example, the tool AT is shown in the form of a hydraulic breaker having its own control valve 44. A return line 46 extends from the tool AT back to the tank 12.

Selector-flow control valve 36 includes a dual purpose valve spool 54. Spool 54 is positionable to direct all hydraulic fluid flow from line 18 directly to line 20, in the same manner as if valve 36 were omitted and line 18 were still connected directly to line 20. It is also positionable to connect line 18 to line 42, and to at the same time regulate the flow into line 42.

Figure 2:
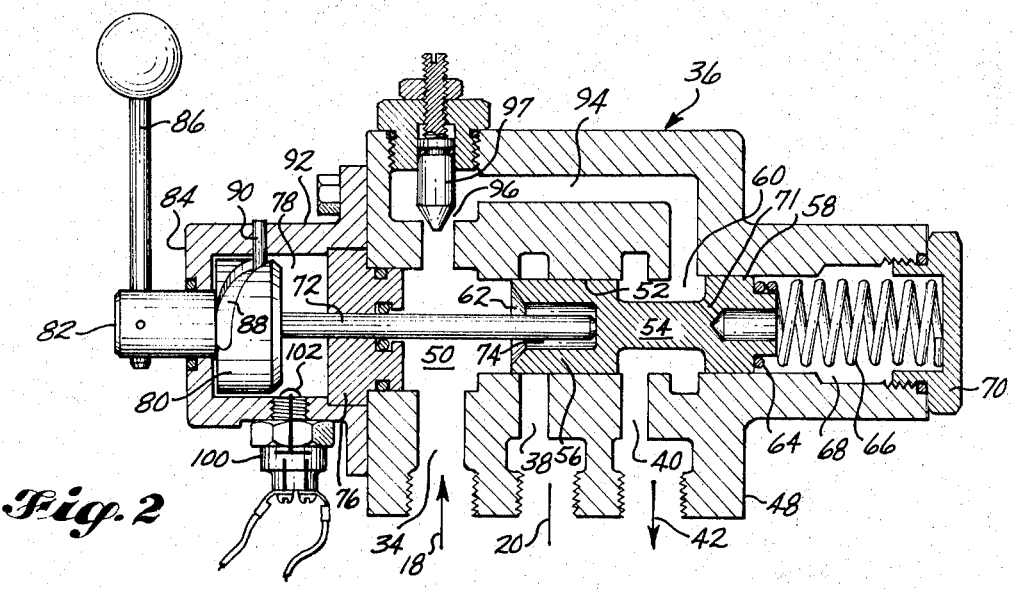
FIG. 2 is a sectional view of a first selector-flow control valve showing the selector rod retracted and the valve spool in an at rest position.
Figure 3:
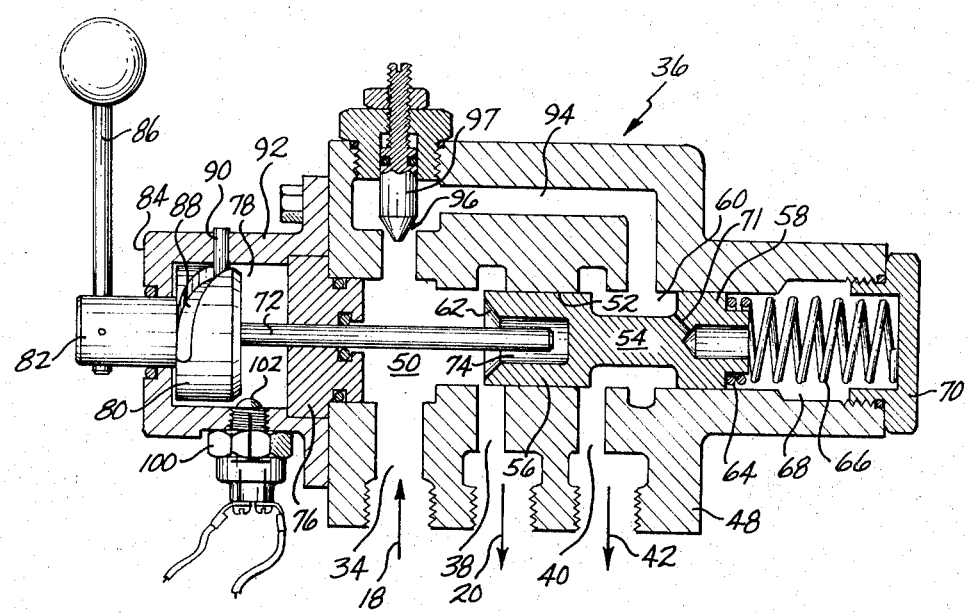
FIG. 3 is a view like FIG. 2 but showing the valve spool in a control position, controlling flow of hydraulic fluid to the auxiliary tool.

Referring now to FIGS. 2 and 3, the valve 36 is shown to comprise a body 48 formed to include a main cavity which is functionally divided into a fluid chamber 50 and a communicating valve spool chamber 52. Valve spool chamber 52 contains a valve spool 54 comprising a pair of lands 56, 58 separated by an annular passage groove 60. A first end 62 of valve spool 54 faces towards the fluid chamber 50. The opposite end 64 of valve spool 54 contacts a calibrated spring 66. Spring 66 is housed within a spring (chamber 68) that is closed by a cap 70 against which the opposite end of spring 66 reacts.

A passageway 71 is provided in the outer end portion of valve spool 54, to communicate the spring chamber 68 with the passage groove 60.

A selector rod 72 extends through the fluid chamber 50. It includes an inner end which projects into a cavity 74 formed in the first end 62 of valve spool 54. Selector rod 72 extends outwardly from chamber 50 through a sealed passageway in a closure plug 76 providing a wall or barrier between the fluid chamber 50 and a cam chamber 78. The outer end of selector rod 72 is connected to a rotary cam 80 which is housed within chamber 78. A control shaft 82 extends axially from cam 80 through a central opening in the outer end wall 84 of the cam housing 78. A radial control handle 86 is attached to the outer end portion of the shaft 82. Cam 80 is formed to include a helical cam groove 88 in its periphery for receiving the inner end portion of a fixed radial pin 90. Pin 90 is connected to and extends radially inwardly from the side wall 92 of the cam chamber housing.

When the selector rod 72 is retracted (FIG. 2) and the valve spool 54 is at rest, the calibrated spring 66 urges the valve spool 54 into a position of rest against the inner end of selector rod 72. When spool 54 is in this position the first land 56 thereof completely blocks the outlet port 38. The outlet port 40 is completely open by virtue of the fact that it is in communication with the passage groove 60.

A passageway 94 extends from the fluid chamber 50 through valve body 48 to the passage groove region of the valve spool chamber 52. A control orifice 96 (which is preferably adjustable as shown) is provided in passageway 94 to cause a drop in pressure between chamber 50 and outlet 40.

When selector rod 72 is retracted its influence on valve spool 54 is only as a stop. Incoming hydraulic fluid flows from line 18 into chamber 50 and from it through passageway 94, then to and through passage groove 60 to outlet port 40, and then into line 42 leading to the auxiliary tool 44. At the start of flow valve spool 54 is biased into its at rest position in which land 56 closes port 38. Orifice 96 causes pressure to build up in chamber 50 to a level determined by the setting of the plug screw 97 and the calibration of spring 66. The spring 66 is calibrated to keep land 56 over port 38 until a predetermined pressure level is achieved. As the pressure increases above such level an unbalanced force is produced against end surface 62, tending to move valve spool 54 to the right as pictured. (FIG. 3). Throughout use of the auxiliary tool 44 the valve spool 54 is influenced in this manner to regulate flow through port 40 (FIG. 3). An increase in flow into chamber 50 increases the pressure differential between surfaces 62, 64, producing an unbalanced fluid force acting on end surface 62, resulting in additional movement of valve spool 54 to the right into a new position of equilibrium. Land 56 moves to decrease the effective area of port 40, so that despite the increase in flow into chamber 50 the flow through port 40 into line 42 remains substantially constant. This same movement of land 56 uncovers more of outlet port 38, so that the excess flow can be returned via port 38 into line 20.

When it is desired to disconnect the auxiliary tool AT from the system the operator need only swing the handle 86 over into a horizontal position. This moves the stationary pin 90 relatively through the cam groove 88, forcing the selector rod 72 to move axially from the position shown in FIGS. 2 and 3 into the position shown in FIG. 4. Rod 72 in turn displaces the valve spool 54 to the right (as pictured) into a second position of rest in which the outlet port 38 is completely uncovered, outlet port 40 is completely blocked, and all flow from chamber 50 is through outlet 38 into line 20. When the selector valve 36 is in this position the basic circuit is restored — line part 18 is in effect directly connected to line part 20 as if valve 36 were not in the system.

According to the invention, the starting circuit for the engine which drives pump 10 should be provided with means to prevent starting of such engine whenever the selector valve 36 is in a position connecting line 18 with line 42. This is an important feature because if port 40 were to be left open and port 38 closed during engine cranking, enough pressure could be developed in line 16 to cause the electric starter for such engine to stall. This is especially true if flow through line 42 is blocked, e.g. by a closed disconnect valve in line 42.

In the embodiments shown by FIGS. 2-6 an electric switch 100 is mounted on the side wall 92 of the cam housing. It includes an actuator button 102 which projects radially into the cam chamber 78, into the path of travel of the cam 80. Switch 100 is wired into the starter circuit for the engine which drives hydraulic pump 10. When cam 80 is in the position shown by FIGS. 2 and 3, and line 18 is connected (via port 34, chamber 50, passageway 94, passage groove 60 and outlet port 40) to line 42, the actuator button 102 is released and the switch 100 is open. When cam 80 is in the position shown by FIG. 4, and valve spool 54 is positioned to open port 38 and close 40, cam 80 is in contact with the switch actuator 102 and has depressed it to close switch 100. As previously mentioned, when switch 100 is closed the electrical system is operable to start the engine which drives the pump 10.

The lead angle of the cam groove 88 is such that the combined forces of the spring 66 and the fluid within spring chamber 68, acting on the right end of valve spool 54 (as pictured), are sufficient to cause cam 80 to rotate unless the cam pin is seated at one end or the other of the cam groove 88. This arrangement assures that the selector rod 72 is either fully retracted or fully extended and prevents it from assuming an intermediate position.

Figure 4:
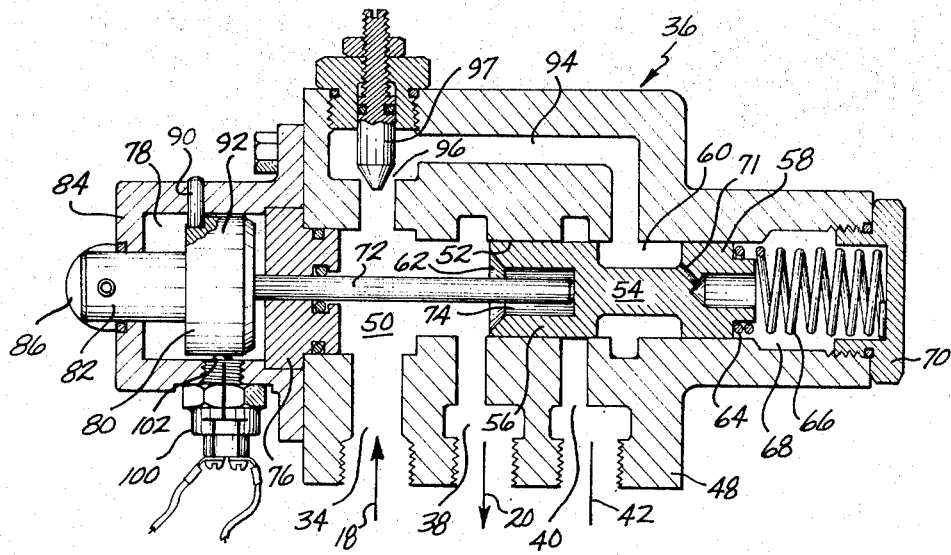
FIG. 4 is a view like FIGS 2 and 3, but showing the selector rod extended and the valve spool being held thereby into a position in which it directs all flow back into the circuit for the primary utilization device.
Figure 5:
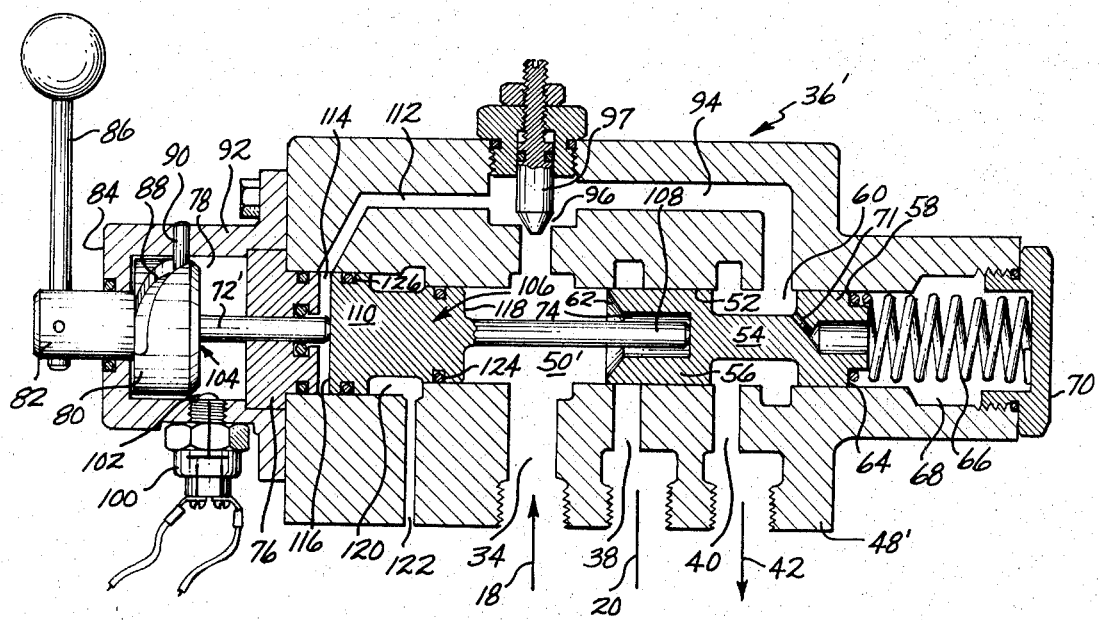
FIG. 5 is a view like FIG. 3, but of a second embodiment.
Figure 6:
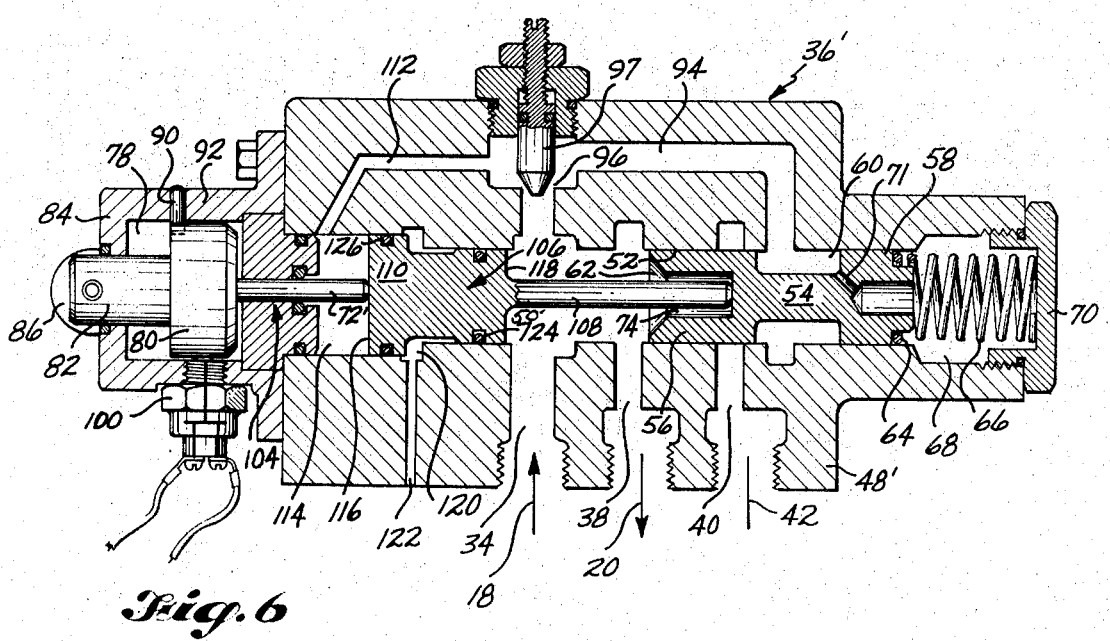
FIG. 6 is a view like FIG. 4, but of the second embodiment shown by FIG. 5.

The valve form 36' shown by FIGS. 5, 6 and 7 is basically like the valve shown in FIGS. 2-4. However, its selector rod is divided into two parts — a first part 72' attached to the cam 80 and a second part 106 having an inner end portion 108 which extends into the end cavity 74 in spool valve 54. A piston head 110 is provided at the outer end of selector rod part 106. When the selector rod 72' is retracted, and the system is at rest (FIG. 5), the spring 66 urges the valve spool 54 into contact with the end portion 108 of selector rod part 106 and piston head 110 into contact with the selector rod part 104. Movement of control handle 86 to extend the selector rod 72' results in selector rod part 104 moving to displace selector rod part 106 to the right, with selector rod part 106 in turn displacing valve spool 54 to the right, into the position shown by FIG. 6. In this operation the two selector rod parts 104, 106 function as if they were connected together.

Selector rod 72' is separated in this form of the invention so that if for some reason fluid flow is stopped because of a blockage at or downstream of orifice 40 the valve spool 54 will be automatically shifted into the position shown by FIG. 6.

Referring to FIGS. 5 and 7, if a blockage occurs at or downstream of port 40, fluid flow through the valve is stopped and orifice 96 no longer causes a pressure drop in passageway 94. In a short time the fluid pressure becomes the same in passageway 94 and in spring chamber 68 as it is in fluid chamber 50'. A branch passageway 112 in body 48' communicates passageway 94 with a variable volume chamber 114 between closure plug 76 and piston head 110. End surface 116 on the piston head 110 is larger than surface 118 at the opposite end of the piston portion of selector rod part 106. The hydraulic pressure created forces acting on the opposite ends of valve spool 54 are substantially equal, so spring 66 tends to force the valve spool 54 to the left (as pictured). The differential area between surfaces 116 and 118 is sufficient to create a force acting to the right which is larger than the force of spring 66. As a result, a net force directed to the right is developed, causing selector rod part 106 to move to the right (as pictured), moving with it the valve spool 54 an amount sufficient to expose passageway 38 to the fluid chamber 50' (FIG. 7).

The fluid pressure in chamber 50' and upstream therefrom will be much greater at this time than during a free flow condition through the valve 36'. However, the spring calibration and the area differential between surfaces 116 and 118 are such that the selector rod part 106 and the valve spool 54 are shifted by a lower pressure in fluid chamber 50' than is required to operate the main relief valve 30 in the primary circuit. The space 120 is vented to the atmosphere or to the system reservoir via a vent passageway 122. This passageway 122 also carries away any fluid which leaks past the seals 124, 126.

The embodiment shown by FIG. 8 is like the embodiment shown by FIGS. 2-5, except that it includes a different type of control mechanism for the selector rod 72''. In this form the cam is replaced by a push-pull control portion 124. Selector rod portion 124 includes an enlarged part 126 providing a seat for one end of a compression spring 128 which is housed within the chamber 78. The opposite end of spring 128 rests against the inner surface of end wall 84. Spring 128 is stronger than spring 66 and it normally urges the selector rod 72'' into its extended position. Thus, it normally holds the valve spool 54 in its second position.

A short link 130 connects the outer end of selector rod portion 124 to the lower end of a control handle 86'. A support arm 132 is rigidly connected to housing wall 84 and an intermediate portion of handle 86' is pivotally attached to arm 132, such as by a pivot pin 134. Pivot pins 136, 138 pivotally attach the opposite ends of the link 130 to the handle 86' and wall 84, respectively.

The valve shown by FIG. 8 is especially useful in connection with an auxiliary utilization device which must be put into operation quickly, such as a braking mechanism. This is because it may also constitute the off-on valve for the auxiliary utilization device. Movement of the handle 86' into the broken line position causes selector rod 72'' to be retracted against a spring 128 which is positioned between a moving wall 126 and the stationary wall 84. When the selector rod 72'' is fully retracted its influence (except as a stop) on valve spool 54 is removed and valve spool 54 functions only as a portion of the flow control mechanism controlling flow from chamber 50 to port 40 via passageway 94.

Although the various selector rods are shown to be of a "push" type, in which an extension of the selector rod which forces the valve spool against its spring, it is to be understood that other embodiments of the invention may be made in which a "pull" type of selector rod is employed. Also, in some installations it may be desirable to operate the selector rod romotely by a solinoid device or by a linear fluid motor instead of by a mechanical lever.

Referring now to FIGS. 9-11, the variable orifice mechanism 140 shown thereby comprises a tubular housing or sleeve 142 which is screwed into a threaded bore 144 formed in the valve housing. A seal (e.g. an O-ring 146) is provided between the inner end of member 142 and the downstream boundary of a port 148 leading from fluid chamber 50 into the passageway 94. A pair of oversize openings or windows 150 are provided in a side wall portion of sleeve member 142 which faces towards the passageway 94. A tubular valve plug 152 is rotatably mounted within sleeve 142. It includes an upper row of flow control orifices 154 alignable with the upper window 150 and a lower row of flow control orifices 156 alignable with the lower window 150. In the illustrated embodiment the valve plug 152 has six (6) different positions within the member 142. In each of these positions a different orifice or combination of orifices 154, 156 is presented towards the windows 150, to provide different flow rates through the mechanism. These flow rates may be indicated on top of the control knob 158. The arrangement of the orifices 154, 156 can vary. For example, in some positions of plug 152 only a single orifice (154 or 156) may be aligned with a window 150. In other positions there may be an orifice 154 aligned with one window 150 and an orifice 156 aligned with the other window 150.

In the illustrated embodiment the control knob 158 is secured to the upstanding shaft portion 160 of the valve plug member 152, such as by a cross pin 162. It carries a ball member 164 which is urged downwardly towards the head portion 166 of member 142 by a compression spring 168. A spring member is housed within a blink socket provided in knob 158. A separate detent 170 is formed in the head portion 166 for each position of valve plug 152. An indexing pin 172 may be provided for indicating the setting of the valve plug 152.

From the foregoing, various further modifications, component arrangement and mode of utilization of the selector flow control valve, and the hydraulic systems, of this invention will be apparent to those skilled in the art to which the invention is addressed, within the scope of the following claims.

What is claimed is:

1. A valve comprising:
   a housing formed to include an inlet, a first outlet, a second outlet, a first passageway extending from said inlet to said first outlet, and a second passageway extending from said inlet to said second outlet;
   a pressure drop restriction in said second passageway;
   a valve plug member in said housing, mounted for movement between an at rest position in which it blocks the first passageway and the second passageway is open and a second position in which it blocks the second passageway and the first passageway is open, said valve plug member having a first transverse surface which is sujected to the inlet pressure and an oppositely directed second transverse surface which is subjected to the pressure in the second passageway downstream of the pressure drop restriction;
   a selector rod movable against said valve plug member for moving it into and holding it in its second position, and movable in the opposite direction into a second position, for freeing the valve member to assume its at rest position unless moved out of such position by an unbalanced pressure force acting on its first transverse surface; and
   a calibrated spring in said housing exerting an endwise force on said valve member tending to move it into its at rest position, with the spring calibration being such that when the selector rod is in its second position, and there is flow through the valve, the spring force and the pressure differential across the two transverse surfaces together position the valve plug, to divide flow between the first and second passageways as necessary to maintain a substantially constant flow through the second passageway.

2. The valve of claim 1, including a fluid chamber and a communicating valve plug chamber, wherein said inlet leads into said fluid chamber, said first and second outlets both extend laterally from said valve plug chamber, said first passageway extends from said fluid chamber axially through said valve plug chamber to said first outlet, and said second passageway extends from said fluid chamber to said second outlet and crosses said valve plug chamber in the vicinity of said second outlet, and wherein said valve plug member is movable axially in said valve plug chamber between said first and second outlets.

3. The valve of claim 1, wherein said selector rod is separate from said valve plug so that when said selector rod is retracted the valve plug can be moved away from it by fluid pressure acting in opposition to said spring.

4. The valve of claim 1, wherein said selector rod includes rotary cam means which when rotated in one direction moves the selector rod against said valve plug to push it into its second position and compress said calibrated spring, and when rotated in the opposite direction moves the selector rod in the opposite direction, with the calibrated spring serving to make said valve plug member follow the selector rod throughout at least a portion of its travel.

5. The valve of claim 4, wherein said rotary cam comprises a cylindrical member including a helical peripheral groove and a fixed pin carried by a portion of the valve housing and projecting into said groove.

6. The valve of claim 4, wherein said selector rod is separate from said valve plug so that when said selector rod is retracted the valve plug can be moved away from it by fluid pressure acting in opposition to said spring.

7. The valve of claim 1, including means for varying the size of the pressure drop restriction, including control handle means situated externally of the valve housing and means for indicating the selected size of the pressure drop restriction.

8. The valve of claim 1, wherein said selector rod is axially divided into a first part having a piston head with a first transverse surface subjected to the inlet pressure and a second, oppositely directed larger transverse surface, and a second separate part that is movable against the second transverse surface or said piston, said valve further including a fluid chamber behind the second transverse surface or said piston and a third passageway for delivering fluid from said passageway into said fluid chamber, so that when the second part of said selector rod is retracted and a blockage occurs at or downstream of said second outlet, fluid from said second passageway will build up in pressure within said fluid chamber and will force the first part of said selector rod against said valve plug to move it into its second position.

9. The valve of claim 1, wherein said selector rod includes spring means normally biasing it against said valve plug, so that said valve plug is normally in its second position, and control means for overcoming such spring means to move said selector rod away from said valve plug.

10. A valve that is connectable into a line portion of a hydraulic circuit for a primary hydraulic powered utilization device, and is selectively operable to either direct flow of hydraulic fluid on through said circuit, or to withdraw at least some of the hydraulic fluid from said circuit, control its flow rate to a predetermined value for powering an auxiliary hydraulic powered utilization device, and then directing the withdrawn hydraulic fluid to an auxiliary hydraulic powered utilization device, said valve comprising:
an inlet and first and second outlets;
a first passageway leading from said inlet to said first outlet;
means for connecting said inlet and said first outlet in series between adjacent line portions of a hydraulic circuit for a primary hydraulic utilization device;
a second passageway leading from said inlet to said second outlet, said second passageway including a pressure drop creating restriction therein;
flow control means responsive to the pressure drop across said restriction for regulating flow through said second passageway to a predetermined value for powering an auxiliary hydraulic powered utilization device, said means including a rectilinear valve member and means mounting it for movement between a first position in which it closes the second second passageway and opens the first passageway, and a second position in which it at least partially closes the first passageway and at least partially opens the second passageway, and a spring biasing said valve member towards said second position; and
selector rod means for moving said valve member into, and the holding it in, said first position.

11. The valve of claim 10, including a fluid chamber and a communicating valve plug chamber, weerein said inlet leads into said fluid chamber, said first and second outlets both extend laterally from said valve plug chamber, said first passageway extends from said fluid chamber axially through said valve plug chamber to said first outlet, and said second passageway extends from said fluid chamber to said second outlet and crosses said valve plug chamber in the vicinity of said second outlet, and wherein said valve plug member is movable axially in said valve plug chamber between said first and second outlets.

12. The valve of claim 10, wherein said selector rod is separate from said valve plug so that when said selector rod is retracted the valve plug can be moved away from it by fluid pressure acting in opposition to said spring.

13. The valve of claim 10, wherein said selector rod includes rotary cam means which when rotated in one direction moves the selector rod against said valve plug to push it into its first position and compress said calibrated spring, and when rotated in the opposite direction moves the selector rod in the opposite direction, with the calibrated spring serving to make said valve plug member follow the selector rod throughout at least a portion of its travel.

14. The valve of claim 13, wherein said rotary cam comprises a cylindrical member including a helical peripheral groove and a fixed pin carried by a portion of the valve housing and projecting into said groove.

15. The valve of claim 14, wherein said selector rod is separate from said valve plug so that when said selector rod is retracted the valve plug can be moved away from it by fluid pressure acting in opposition to said spring.

16. The valve of claim 10, including means for varying the size of the pressure drop restriction, including control handle means situated externally of the valve housing and means for indicating the selected size of the pressure drop restriction.

17. A selector-flow control valve, comprising:
means defining a fluid chamber and a communicating valve spool chamber;
an inlet port leading into said fluid chamber;
a first outlet port leading from said valve spool chamber;
a second outlet port leading from said valve spool chamber;
a valve spool in said valve spool chamber including first and second lands separated by an annular passage groove, said first land having an outer end surface exposed to said fluid chamber, and said second land having an outer end surface;
a flow passageway including a restriction, extending from said fluid chamber to and through said valve spool chamber, via the passage groove in said valve chamber, to the second outlet port, said passageway including a pressure drop producing restriction between said fluid chamber and said passage groove;
a spring contacting the outer end surface of said second land, said spring exerting a biasing force on said valve spool, tending to urge it towards said fluid chamber;
means communicating the outer end of said second land with said flow passageway downstream of said restriction;
said valve spool having a first position in which outflow from said valve is primarily through the second outlet port and such flow is regulated by the first land of said valve spool changing the effective sizes of said first and second outlet orifices upon said valve spool moving in response to pressure changes within said fluid chamber, and said first outlet port serves as a relief port for said fluid chamber; and
selector rod means for moving said valve spool into a position in which the second outlet port is blocked by said first land and outflow from said valve is totally through said first outlet port.

* * * * *

UNITED STATES PATENT OFFICE
CERTIFICATE OF CORRECTION

Patent No. 3,818,926                           Dated June 25, 1974

Inventor(s)  Donald M. Wohlwend

It is certified that error appears in the above-identified patent and that said Letters Patent are hereby corrected as shown below:

Column 9, line 30, delete the word "second" (second occurrence)

Column 9, line 39, "weerein" should be "wherein".

Column 10, line 35, "chamber" should be "member".

Signed and sealed this 8th day of October 1974.

(SEAL)
Attest:

McCOY M. GIBSON JR.                    C. MARSHALL DANN
Attesting Officer                      Commissioner of Patents